2,767,201

PROCESS OF PREPARING ORGANO-OXYPOLYSILOXANES

Walter Noll, Heinz Jonas, and Peter Simons, Leverkusen, Germany, assignors to Farbenfabriken Bayer Aktiengesellschaft, Leverkusen, Germany, a corporation of Germany No Drawing. Application January 11, 1952, Serial No. 266,092

Claims priority, application Germany January 13, 1951

4 Claims. (Cl. 260—448.8)

The present invention relates to a process of preparing organo-oxypolysiloxanes.

The compounds obtained according to the invention correspond for instance, as far as they are of a purely linear chain-like structure, to the type

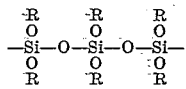

the group OR standing for a higher aliphatic or aromatic hydroxy group, for instance the butoxy-, amyloxy-, octoxy-, phenoxy-, or cresoxy group.

The process of the invention consists in that mixed silicic acid esters $(RO)_nSi(OR')_{4-n}$ containing lower aliphatic alkoxy groups OR', for instance methoxy or ethoxy groups, and higher aliphatic or aromatic groups OR are reacted in an acid medium with water in the presence of an excess of an alcohol preferably containing the same group OR, $n$ standing for an integer from 1–3. According to a special embodiment of the invention water is preferably employed in a quantity required for saponifying the OR'-group only.

The mixed silicic acid esters used as starting materials are known to those skilled in the art. They may be produced for instance by partial interchange of orthosilicic acid esters $Si(OR')_n$ or by esterification of alkoxy- or aroxy - halogenosilanes $(RO)_nSiX_{4-n}$ (X=halogen, $n=1$–3). Thus, for instance, the mixed alkoxy silanes $(C_4H_9O_2)Si(OCH_3)_2$, $(C_4H_9O)Si(OCH_3)_3$ and $(C_4H_9O)_3SiOCH_3$ may be obtained by ester interchange of tetramethoxy silane with butanol and by fractionating the reaction product, or by partial esterification of silicon tetrachloride with butanol to form butoxy-chlorosilanes, fractionating the reaction mixture and esterifying the butoxy-chlorosilanes with methanol.

The aforesaid compounds are reacted in the process of the invention with a mixture consisting of water and alcohol. Depending on the amount of water used, products of different degrees of condensation are obtained. The reaction is preferably carried out with a mixture containing about that amount of water theoretically required for saponification of the OR'-group only and preferably the alcohol containing the group OR. For saponification of for instance dibutoxy-dimethoxy silane, the reaction is carried out with a mixture consisting of butanol and water. The theoretical quantity of water to be added amounts to 1 mol $H_2O$ per 1 mol $(C_4H_9O)_2Si(OCH_3)_2$.

Furthermore, the mixture used according to the invention must show an acid reaction. If the addition of an acid is required its quantity is preferably adjusted in such a manner that the acid component corresponds to about a 1/100 to 1/10 normal aqueous acid.

Saponification of the OR'-group of the mixed organo-oxysilanes proceeds rapidly under the conditions of the reaction, when using methoxy groups already within some minutes. After completion of the saponification process the mixture is distilled until the alcohol is completely removed. The alkoxy or aroxy polysiloxanes are obtained in form of more or less viscous liquids or as resins.

The possibility of partially saponifying the mixed alkoxy- or aroxy-silanes under the conditions of the new process is novel and surprising, for it is stated in the chemical literature that dissimilar alkoxy groups in mixed alkoxy silanes do not differ in their saponifiability.

The process of the invention allows to perform the controlled production of alkoxy- and aroxy-polysiloxanes of different polymerization degrees, which contain higher alkoxy or aroxy groups like in the production of the different alkoxy or aroxy polysiloxanes from alkyl halogeno silanes or alkyl-alkoxy-silanes. The nature of the resulting alkoxy- or aroxy-polysiloxanes depends on the composition of the mixed ester used which may correspond to the type $(RO)Si(OR')_3^{(I)}$, or $(RO)_2Si(OR')_2^{(II)}$, or $(RO)_3Si(OR')^{(III)}$, or to mixtures of said compounds, eventually with the addition of $Si(OR')^{(IV)}$. The compounds of the type (I) eventually mixed with (IV) or (II) generally gives rise to resinous products. The compounds of the type (II) eventually mixed with (III) give more or less thickly liquid oils, the compounds (III) yield relatively thickly liquid oils the composition of which corresponds to a hexa-alkoxy- or hexa-aroxy disiloxane.

The oily alkoxy-polysiloxanes are liquids showing a low solidification point and a high boiling point. Their viscosity is only slightly affected by the ambient temperature. They are e. g. especially suited as hydraulic liquids and lubricants at low temperatures.

The invention is further illustrated by the following examples without being restricted thereto, the parts given being by weight.

Example 1

245 parts of dibutoxy-dichlorosilane produced by partial esterification of silicon tetrachloride with butanol and rectification of the reaction product, are esterified with 64 parts of methanol by slowly dropping the methanol to the silane. The mixture is heated to boiling until the chief quantity of hydrogen chloride is expelled, and the remainder is distilled in vacuo. 236 parts of the reaction product are mixed with a mixture consisting of 18 parts of water and 180 parts of butanol and shaken for some minutes. The system is monophase and shows a pH-value of 2.5 due to a residual HCl-content of the silane. For removing the butanol the mixture is distilled in vacuo. After raising the temperature up to 200 C. at 50 mm. Hg an oil consisting of butoxy-polysiloxanes is obtained which comes close to the composition $(C_4H_9O)_2SiO$.

Example 2

152 parts of tetramethoxysilane are partly re-esterified with 148 parts of butanol. The reaction product is subjected to fractional distillation. Of the resulting fractions 100 parts of the fraction corresponding to the composition of dibutoxy-dimethoxysilane are mixed with 7.6 parts of a 1/100 normal aqueous hydrochloric acid and 76 parts of butanol and vigorously shaken for some minutes. The mixture is heated in vacuo until the portions distilling over at 200° C. and 50 mm. Hg are removed. The residue represents an oily butoxy-siloxane of analogous composition as that obtained according to Example 1.

Example 3

283 parts of tri-butoxy-chlorosilane produced by partial esterification of silicon tetrachloride with butanol and rectification of the resulting reaction product are esterified with 32 parts of methanol by slowly dropping the methanol to the silane. The mixture is heated to boiling until the chief quantity of the hydrogen chloride is expelled, and the remainder distilled in vacuo. Thereupon 278 parts of the reaction product are mixed with a mixture consisting of 9 parts of water and 90 parts of butanol and shaken for a short time. The monophase mixture shows a pH-value of about 2. The butanol is removed by distilling the mixture in vacuo. After increasing the temperature to 160° C. at 15 mm. Hg a residue is obtained the composition of which corresponds to hexabutoxy-disiloxane $(C_4H_9O)_3Si-O-Si(C_4H_9O)_3$.

*Example 4*

245 parts of dibutoxy-dichlorosilane produced by partial esterification of silicon tetrachloride with butanol and rectification of the resulting reaction product, are esterified with 64 parts of methanol by slowly dropping the methanol to the silane. The mixture is heated to boiling until the chief quantity of hydrogen chloride is removed, and the remainder distilled in vacuo. 236 parts of the reaction product are mixed with a mixture consisting of 36 parts of water and 360 parts of butanol and briefly shaken. The butanol is distilled off in vacuo by increasing the temperature to 200° C. at 50 mm. Hg. A thickly liquid oil consisting of butoxy-polysiloxanes and showing at 20° C. a viscosity of 120 centistokes is obtained.

We claim:

1. Process for the preparation of organo-oxypolysiloxanes which comprises treating an ortho silicic acid ester having the general formula

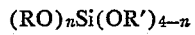

$(RO)_nSi(OR')_{4-n}$ in which R' is a member selected from the group consisting of methyl and ethyl radicals, R is a member selected from the group consisting of normal butyl, isobutyl, and secondary butyl radicals, and $n$ is a number from 1–3, with water in the presence of an excess of a butyl alcohol in an acid medium, the butyl radical of said alcohol being identical to said R, and recovering an organo-oxypolysiloxane.

2. Process according to claim 1, in which said water is present in amount necessary for hydrolyzing the OR' radical.

3. Process according to claim 1, in which R' is a methyl radical.

4. Process according to claim 1, in which R' is an ethyl radical.

References Cited in the file of this patent

UNITED STATES PATENTS

| | | |
|---|---|---|
| 2,053,474 | Graves | Sept. 8, 1936 |
| 2,317,891 | Dennison | Apr. 27, 1943 |
| 2,547,944 | Iler | Apr. 10, 1951 |
| 2,566,365 | Pedlow | Sept. 4, 1951 |
| 2,637,719 | Dereich | May 5, 1953 |

FOREIGN PATENTS

| | | |
|---|---|---|
| 625,077 | Germany | May 24, 1938 |
| 662,732 | Germany | July 30, 1938 |
| 989,579 | France | May 23, 1951 |

OTHER REFERENCES

Peppard: Jour. Am. Chem. Soc., vol. 68 (1946), pp. 77–79.